United States Patent
Erman et al.

(10) Patent No.: US 11,271,852 B2
(45) Date of Patent: Mar. 8, 2022

(54) CLUSTER ORIENTED DYNAMIC ROUTING

(71) Applicant: Nokia Solutions and Networks OY, Espoo (FI)

(72) Inventors: Bilgehan Erman, Weehawken, NJ (US); Ejder Bastug, Paris (FR); Bruce Cilli, Atlantic Highlands, NJ (US); Sameerkumar Sharma, Holmdel, NJ (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 293 days.

(21) Appl. No.: 16/515,232

(22) Filed: Jul. 18, 2019

(65) Prior Publication Data

US 2021/0021512 A1    Jan. 21, 2021

(51) Int. Cl.
| | |
|---|---|
| H04L 12/715 | (2013.01) |
| H04L 12/801 | (2013.01) |
| H04L 12/721 | (2013.01) |
| H04L 45/00 | (2022.01) |
| H04L 45/12 | (2022.01) |
| H04L 47/10 | (2022.01) |

(52) U.S. Cl.
CPC .............. H04L 45/46 (2013.01); H04L 45/12 (2013.01); H04L 47/18 (2013.01)

(58) Field of Classification Search
CPC .......... H04L 45/46; H04L 45/12; H04L 47/18
USPC ....................................................... 370/389
See application file for complete search history.

(56) References Cited

U.S. PATENT DOCUMENTS

| | | | |
|---|---|---|---|
| 5,602,839 A | 2/1997 | Annapareddy et al. | |
| 7,281,057 B2 | 10/2007 | Cain | |
| 9,258,208 B2 | 2/2016 | Thubert et al. | |
| 10,581,736 B1 * | 3/2020 | Choudhury | H04L 41/14 |
| 2003/0202465 A1 | 10/2003 | Cain | |
| 2010/0208721 A1 | 8/2010 | Miyazaki | |
| 2012/0087377 A1 | 4/2012 | Lai | |

FOREIGN PATENT DOCUMENTS

WO    WO-2003-058868 A2    7/2003

OTHER PUBLICATIONS

Deepesh Kaushal et al., "Hierarchical Cluster Based Routing for Wireless Mesh Networks Using Group Head", 2012 International Conference on Computing Sciences, Sep. 14-15, 2012, Phagwara, India (https://ieeexplore.ieee.org/document/6391666).

(Continued)

*Primary Examiner* — Gbemileke J Onamuti
(74) *Attorney, Agent, or Firm* — Harness, Dickey & Pierce, P.L.C.

(57) ABSTRACT

A method for routing traffic between a source node and a destination node in a network comprises: identifying a first group level at which a source group vector and a destination group vector differ; obtaining one or more first route segments between a first source group and a first destination group at the first group level; computing an end-to-end route between the source node and the destination node based on at least the one or more first route segments; and routing traffic between the source node and the destination node on the end-to-end route.

18 Claims, 3 Drawing Sheets

(56) References Cited

OTHER PUBLICATIONS

Xu Li et al., "Creating logical zones for hierarchical traffic engineering optimization in SDN-empowered 5G", 2015 International Conference on Computing, Networking and Communications (ICNC), Feb. 16-19, 2015, Garden Grove, CA, USA. (https://ieeexplore.ieee.org/document/7069497).

Tatsuya Otoshi et al., "Hierarchical Model Predictive Traffic Engineering", IEEE/ACM Transactions on Networking, pp. 1754-1797, vol. 26, is. 4, Jul. 12, 2018. (https://ieeexplore.ieee.org/document/8410439).

Jingyu Hua et al., "Topology-Preserving Traffic Engineering for Hierarchical Multi-Domain SDN", Computer Neworks (International Journal of Computer and Telecommunications Networking), vol. 140, pp. 62-77, Jul. 20, 2018. (https://www.sciencedirect.com/science/article/abs/pii/S1389128618301749).

D. King et al., "The Application of the Path Computation Element Architecture to the Determination of a Sequence of Domains in MPLS and GMPLS", Internet Engineering Task Force (IETF), Nov. 2012. (https://tools.ietf.org/html/rfc6805).

Extended European Search Report dated Aug. 21, 2020 in European Application No. 20177842.0.

\* cited by examiner

CLUSTER ORIENTED DYNAMIC ROUTING

BACKGROUND

Conventional routing methods in packet networks include link state protocols used within autonomous domains (e.g., Intermediate System to Intermediate System (IS-IS) and Open Shortest Path First (OSPF)) and more highly scalable path vector protocols (e.g., Border Gateway Protocol (BGP)) for connectivity between autonomous domains. A goal of the traditional routing protocols is to determine a loop free reachability of destination addresses.

SUMMARY

One or more example embodiments provide representation of network topology as hierarchical clusters or groups of nodes based on one or more grouping criteria.

One or more example embodiments provide methods for routing in a packet network based on distinct network identifiers that more closely match the intended grouping criteria of nodes in the packet network, while being independent of the node identifiers.

One or more example embodiments provide methods for near-real-time end-to-end (E2E) route calculation on highly scalable network topologies by dividing a domain into clusters according to criteria of interest. The criteria of interest may be a performance metric such as latency, geo-location, administrative attribute, or a function that combines multiple metrics.

One or more example embodiments provide methods for collecting and assessing network status data at multiple nodes such that the required computational and/or message communication load may be distributed more optimally in terms of adjacency to the data source.

One or more example embodiments provide methods for bounding network resource utilization driven by incoming demand by localizing the computational load of E2E route calculation on message-originating (source) nodes.

One or more example embodiments provide methods for exploring improved E2E routes as network conditions change dynamically.

At least one example embodiment provides a method for routing traffic between a source node and a destination node in a network, the method comprising: identifying a first group level at which a source group vector and a destination group vector differ; obtaining one or more first route segments between a first source group and a first destination group at the first group level; computing an end-to-end route between the source node and the destination node based on at least the one or more first route segments; and routing traffic between the source node and the destination node on the end-to-end route. The source group vector includes a set of source group identifiers for the source node, each source group identifier in the set of source group identifiers identifying a source group at a group level in a hierarchy of source groups including the source node. The destination group vector includes a set of destination group identifiers for the destination node, each destination group identifier in the set of destination group identifiers identifying a destination group at a group level in a hierarchy of destination groups including the destination node.

A non-transitory computer-readable medium storing computer-executable instructions that, when executed by at least one processor at a source node, cause the source node to perform a method for routing traffic between the source node and a destination node in a network, the method comprising: identifying a first group level at which a source group vector and a destination group vector differ; obtaining one or more first route segments between a first source group and a first destination group at the first group level; computing an end-to-end route between the source node and the destination node based on at least the one or more first route segments; and routing traffic between the source node and the destination node on the end-to-end route. The source group vector includes a set of source group identifiers for the source node, each source group identifier in the set of source group identifiers identifying a source group at a group level in a hierarchy of source groups including the source node. The destination group vector includes a set of destination group identifiers for the destination node, each destination group identifier in the set of destination group identifiers identifying a destination group at a group level in a hierarchy of destination groups including the destination node.

According to one or more example embodiments, the method may further include: obtaining one or more second route segments between at least two second source groups at a second group level in the hierarchy of source groups; obtaining one or more third route segments between at least two second destination groups at the second group level in the hierarchy of destination groups; wherein the computing computes the end-to-end route based on the one or more first route segments, the one or more second route segments and the one or more third route segments, and the second group level is lower than the first group level.

The hierarchy of source groups may include a plurality of group levels arranged based on a first performance metric, or the hierarchy of destination groups may include a plurality of group levels arranged based on a second performance metric. The first performance metric may include at least one of latency, geo-location, or an administrative attribute associated with nodes in each source group; or the second performance metric may include at least one of latency, geo-location or an administrative attribute associated with nodes in each destination group.

The identifying may include comparing elements of the set of source group identifiers and with elements of the set of destination group identifiers to identify the first group level.

The method may further include determining that all route segments connecting the source node and the destination node have been collected; and wherein the computing computes the end-to-end route in response to determining that all route segments connecting the source node and the destination node have been collected.

The first group level is a $k^{th}$ group level where the source and destination groups differ; and the obtaining may include: sending a first route request to a designated group leader of the group at a $(k+1)^{th}$ group level, which is the same for the source and the destination, the first route request requesting the one or more first route segments; and receiving the one or more first route segments from the designated group leader of a group at a $(k+1)^{th}$ group level in response to the first route request.

The method may further include: sending a second route request to a designated group leader of the source group at the $k^{th}$ group level, the second route request requesting one or more second route segments between source groups at a $(k-1)^{th}$ group level; receiving the one or more second route segments from the designated group leader of the source group at the $k^{th}$ group level in response to the second route request; sending a third route request to a designated group leader of a destination group at the $k^{th}$ group level, the third route request requesting one or more third route segments between destination groups at the $(k-1)^{th}$ group level; receiving the one or more third route segments from the designated group leader of the destination group at the $k^{th}$ group level in response to the third route request; and wherein the computing computes the end-to-end route based on the one or more first route segments, the one or more second route segments and the one or more third route segments.

At least one other example embodiment provides a network apparatus comprising at least one processor and at least one memory including computer program code. The at least one memory and the computer program code are configured to, with the at least one processor, cause the network apparatus to: identify a first group level at which a source group vector and a destination group vector differ; obtain one or more first route segments between a first source group and a first destination group at the first group level; compute an end-to-end route between the source node and the destination node based on at least the one or more first route segments; and route traffic between the source node and the destination node on the end-to-end route. The source group vector includes a set of source group identifiers for a source node, each source group identifier in the set of source group identifiers identifying a source group at a group level in a hierarchy of source groups including the source node. The destination group vector includes a set of destination group identifiers for a destination node, each destination group identifier in the set of destination group identifiers identifying a destination group at a group level in a hierarchy of destination groups including the destination node.

According to at least some example embodiments, the at least one memory and the computer program code may be configured to, with the at least one processor, cause the network apparatus to: obtain one or more second route segments between at least two second source groups at a second group level in the hierarchy of source groups; and obtain one or more third route segments between at least two second destination groups at the second group level in the hierarchy of destination groups; wherein the end-to-end route is computed based on the one or more first route segments, the one or more second route segments and the one or more third route segments, and the second group level is lower than the first group level.

The hierarchy of source groups may include a plurality of group levels arranged based on a first performance metric, or the hierarchy of destination groups may include a plurality of group levels arranged based on a second performance metric. The first performance metric may include at least one of latency, geo-location, or an administrative attribute associated with nodes in each source group, or the second performance metric may include at least one of latency, geo-location or an administrative attribute associated with nodes in each destination group.

The at least one memory and the computer program code may be configured to, with the at least one processor, cause the network apparatus to compare elements of the set of source group identifiers and with elements of the set of destination group identifiers to identify the first group level.

The at least one memory and the computer program code may be configured to, with the at least one processor, cause the network apparatus to determine that all route segments connecting the source node and the destination node have been collected. The end-to-end route may be computed in response to determining that all route segments connecting the source node and the destination node have been collected.

The first group level may be a $k^{th}$ group level. The at least one memory and the computer program code may be configured to, with the at least one processor, cause the network apparatus to obtain the one or more first route segments by: sending a first route request to a designated group leader of a source group at a $(k+1)^{th}$ group level, the first route request requesting the one or more first route segments; and receiving the one or more first route segments from the designated group leader of a source group at a $(k+1)^{th}$ group level in response to the first route request.

The at least one memory and the computer program code may be further configured to, with the at least one processor, cause the network apparatus to obtain the one or more first route segments by: sending a second route request to a designated group leader of the source group at the $k^{th}$ group level, the second route request requesting one or more second route segments between source groups at a $(k-1)^t$ group level; receiving the one or more second route segments from the designated group leader of the source group at the $k^{th}$ group level in response to the second route request; sending a third route request to a designated group leader of a destination group at the $k^{th}$ group level, the third route request requesting one or more third route segments between destination groups at the $(k-1)^{th}$ group level; receiving the one or more third route segments from the designated group leader of the destination group at the $k^{th}$ group level in response to the third route request; and wherein the end-to-end route is computed based on the one or more first route segments, the one or more second route segments and the one or more third route segments.

At least one other example embodiment provides a network apparatus comprising means for identifying a first group level at which a source group vector and a destination group vector differ; means for obtaining one or more first route segments between a first source group and a first destination group at the first group level; means for computing an end-to-end route between the source node and the destination node based on at least the one or more first route segments; and means for routing traffic between the source node and the destination node on the end-to-end route. The source group vector includes a set of source group identifiers for a source node, each source group identifier in the set of source group identifiers identifying a source group at a group level in a hierarchy of source groups including the source node. The destination group vector includes a set of destination group identifiers for a destination node, each destination group identifier in the set of destination group identifiers identifying a destination group at a group level in a hierarchy of destination groups including the destination node.

According to at least some example embodiments, the network apparatus may further include: means for obtaining one or more second route segments between at least two second source groups at a second group level in the hierarchy of source groups; and means for obtaining one or more third route segments between at least two second destination groups at the second group level in the hierarchy of destination groups; wherein the end-to-end route is computed based on the one or more first route segments, the one or more second route segments and the one or more third route segments, and the second group level is lower than the first group level.

The hierarchy of source groups may include a plurality of group levels arranged based on a first performance metric, or the hierarchy of destination groups may include a plurality of group levels arranged based on a second performance metric. The first performance metric may include at least one of latency, geo-location, or an administrative attribute associated with nodes in each source group, or the second performance metric may include at least one of latency, geo-location or an administrative attribute associated with nodes in each destination group.

The network apparatus may further include means for comparing elements of the set of source group identifiers and with elements of the set of destination group identifiers to identify the first group level.

The network apparatus may further include means for determining that all route segments connecting the network apparatus and the destination node have been collected. The end-to-end route may be computed in response to determining that all route segments connecting the source node and the destination node have been collected.

The first group level may be a $k^{th}$ group level. The means for obtaining the one or more first route segments may include: means for sending a first route request to a designated group leader of a source group at a $(k+1)^{th}$ group level, the first route request requesting the one or more first route segments; and means for receiving the one or more first route segments from the designated group leader of a source group at a $(k+1)^{th}$ group level in response to the first route request.

The means for obtaining the one or more first route segments may further include: means for sending a second route request to a designated group leader of the source group at the $k^{th}$ group level, the second route request requesting one or more second route segments between source groups at a $(k-1)^{th}$ group level; means for receiving the one or more second route segments from the designated group leader of the source group at the $k^{th}$ group level in response to the second route request; means for sending a third route request to a designated group leader of a destination group at the $k^{th}$ group level, the third route request requesting one or more third route segments between destination groups at the $(k-1)^{th}$ group level; means for receiving the one or more third route segments from the designated group leader of the destination group at the $k^{th}$ group level in response to the third route request; and wherein the end-to-end route is computed based on the one or more first route segments, the one or more second route segments and the one or more third route segments.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

One or more example embodiments describe methods for routing packets in networks. A network is composed of hosts (e.g., computers or other networked electronic devices) and nodes (e.g., routers, switches, etc.). A node represents a network transit function that forwards packets between its ports, which are the access points of the node. Links connect to the ports to interconnect nodes. Series of connected links form a path and interconnected nodes form a network topology.

A goal of a routing function is to find a path to reach a destination across a topology within the constraints of a policy. A destination can be a network, host, or group of nodes. Nodes, ports, links and hosts may be physical or virtual entities.

One or more example embodiments relate to groups of networks where messages sent between nodes form a packet. A packet has a variable length and typically also a maximum size. Packets may have defined (e.g., predefined) data encapsulation rules that describe network control and application related data fields. Packets may be sent from a node asynchronously anytime without coordination with other nodes.

Packets transmitted between the same source-destination pair may have an application level or temporal association in which case the successively transmitted packets form a flow. Packets of different flows transmitted on the same shared medium provide the capability of multiplexing on the shared medium.

Packets waiting for transmission at, for example, a host or node, may be buffered in queues. When transmitting packets, nodes may follow an administered policy to schedule packet transmission with different priorities. Nodes may alter packet flows by dropping and/or delaying packets to police input rate, or to smooth out transmission rate.

One or more example embodiments provide routing functions for types of network topologies having a relatively large number of nodes (e.g., on a scale such as the $2^{128}$ IPv6 address space as the limit) that may be added and/or removed dynamically. The dynamically changing network is assumed to be large enough to the point that finding an optimal path between a source and a destination of packet transmission is a non-trivial problem.

Packet networks have non-deterministic latency induced on message transmissions. Adjacencies of the nodes within a network topology play an important role on message latency that is likely to be observed.

Examples of routing scenarios for relatively large packet networks include: routers grouped as an autonomous system (AS) and routing IPv6 packets within the AS using Inter Gateway Protocols (e.g., IS-IS or OSPF); and routing packets between autonomous systems using protocols such as Border Gateway Protocol (BGP).

One or more example embodiments provide routing functions applicable to autonomous networks in which new traffic engineering policies introduce relatively high dimensional constraints and/or have relatively high routing solution-state-space and real-time computation needs. One or more example embodiments also provide routing functions that are sufficiently flexible to cope with the control complexity of the new level of dynamism associated with network virtualization.

In existing IP-networks, destinations are identified by IP addresses. For routing purposes, the same destination identifier is also used to determine reachability. By using IP address masks, the destination identifiers are summarized to form network identifiers, which are referred to as prefixes.

Identifying networks only by prefixes of destination addresses limit the routing object to a single value instead of having the capability to use a vector of values that can represent inherent structures. Existing routing protocols compensate for this by introducing identifiers to nodes (routers) and using vectors of these identifiers for routing. However, these identifiers do not represent a network topology or any of the structural properties of the network topology. The prefix-based and node-identifier-based routing schemes remove the orientational information of the network topology that can be used to reduce complexities and/or improve routing capabilities.

As an example, consider the following two nodes:
Destination A—2001:0db8:1000::1—located in Berkeley, Calif.
Destination B—2001:0db8:2000::1—located in Manhattan, N.Y.

For a destination C also located somewhere in Berkeley, Calif. an address 2001:0db8:3000::1, the routing table for the existing solutions will have two values for the reachability of prefixes 2001:0db8:1000::/32 and 2001:0db8:2000::/32 (for destinations A and B, respectively) with no other discernible information regarding the fact that one node is located within a 10 km and the other one is located 4000 km away and there may be multiple network provider networks in between.

"Segment routing," such as Multiprotocol Label Switching (MPLS)-based or IPv6-based segment routing, provides the capability to represent a dynamically computable route vector for messages to follow. However, MPLS-based segment routing also uses a scheme of node identifiers that are distinct from the domain of destination identifiers of the IP-network. Like the IP-network identifiers, the router identifiers do not represent an orientational structure of the network topology. IPv6-based segment routing directly uses IP-network identifier to define the route vector.

Because of the limited representational structure of the identifiers, it may be relatively difficult to decompose route calculation for distributed computing. The calculations are either done by a central controller (such as path computation element (PCE) or other network apparatus or device) or by individual nodes using local, isolated context that needs to be synchronized.

In some cases, destination addresses may also appear as routing table entries (with no prefix summary), in which case, any minor change of the destination identifiers will also impact entries across the whole chain of nodes.

With the current node and destination identification schemes, routing loops may form relatively easily because the identifiers do not provide any topological context, and extracting network designations from IP-addresses by prefixing is an ambiguous procedure. Therefore, most of the complexity of the routing solutions comes from having to eliminate routing loops and blackholes (besides the new challenges of the highly dynamic, and autonomous network operations).

One or more example embodiments may involve at least the following concepts: (i) the computational effort for route calculation may be (e.g., optimally) distributable; (ii) network identifiers may represent the clustered, hierarchical structure of the networks; (iii) networks may have identifiers independent of the destination identifiers; and (iv) route determination may be performed based on network identifiers instead of destination identifiers.

One or more example embodiments enable routing computations to be done at several designated points that correspond to the native clustering structure of a network topology. These decision points also correspond to locations of the sources of dynamic network status information.

Real-world networks form node clusters. For example, in enterprises, a department may have computers on a Local Area Network (LAN) subnet, the building may have a group of subnets, the campus may have group of networks in buildings, and so on, forming a hierarchy of clusters (or groups of nodes). From a network engineering perspective, the clustering may have correlation to properties, such as expected latency of message transmissions. To capture this information, networks may be represented by a vector of identifiers.

Networks and destinations within those networks are different objects with different properties. Therefore, identifiers used for networks and destinations should not have interdependencies. This is like the analogy of naming people and where they live. People have names, such as Jane, and they live in places, such as Manhattan. The problem of locating Jane becomes simpler if where she lives is a distinct object, rather than modelling the problem as locating Jane-of-Manhattan. In the route calculation context, the latter form transforms into an unwieldy collection of references to thousands of others such as John-of-Manhattan, Mary-of-Manhattan. If one embeds location of Jane into her identity, then the process of extracting the location back from the converged identify becomes an ambiguous procedure—just like what happens when trying to identify and route to destinations (not networks) by trying to construct network identities from prefixed destination IP-addresses.

As mentioned above, real-world networks form clusters based on various properties. A relevant example of a property is a spatial distribution of network destinations with implications on packet transmission latency. As discussed herein, the phrase "Latency Groups" will be used to refer to an example of network clusters (or groups of nodes). Latency Groups will also be referred to as "Groups" or "groups" and designated by the notation $G_i^{[k]}$, where k represents a group's level within the containment hierarchy (hierarchy groups), and i represents the identifier of the group (group identifier). Thus, a given group has an associated group level and an identifier.

Figure 1:
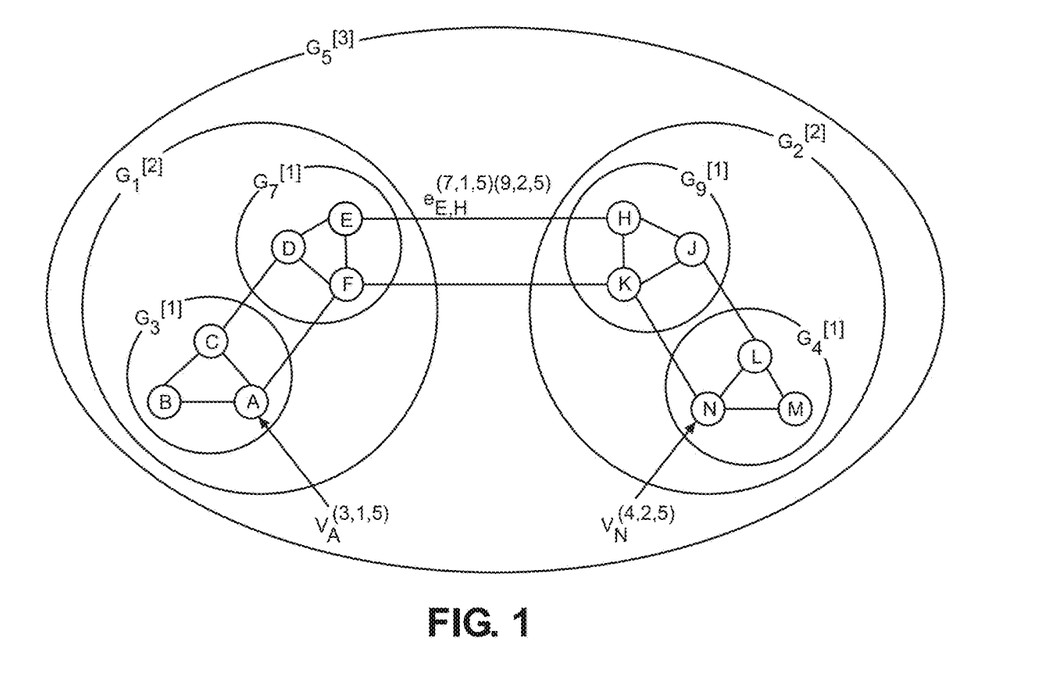
FIG. 1 illustrates a network topology according to example embodiments.
Figure 2:
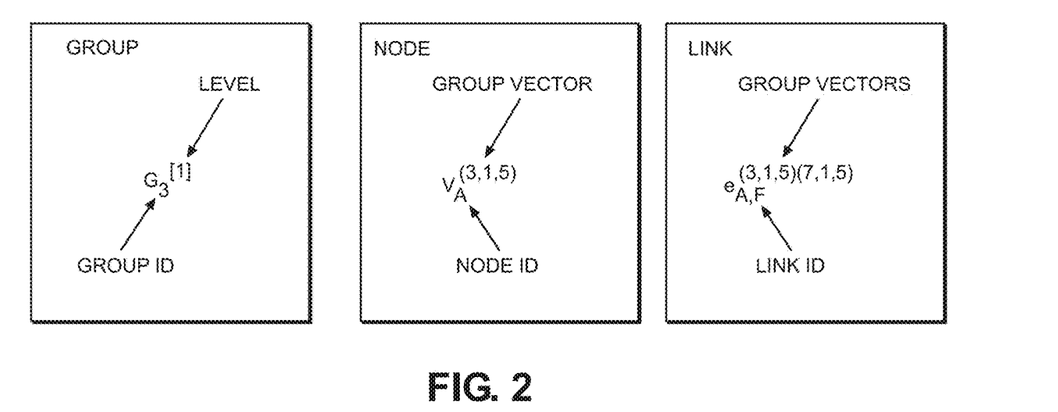
FIG. 2 illustrates example notations for a group, a node and a link shown in FIG. 1.

FIG. 1 illustrates a network topology according to example embodiments. FIG. 2 illustrates example notations for a group, a node and a link shown in FIG. 1.

Referring to FIGS. 1 and 2, based on a set criteria such as the latency bounds discussed above, nodes [A,B,C], [D,E,F], [H,K,J], and [L,M,N] form first-level-groups, marked as $G_3^{[1]}$, $G_7^{[1]}$, $G_9^{[1]}$, and $G_4^{[1]}$, respectively. In one example, this first-level-grouping may be bounded by about 1 millisecond (ms) average transmission latency between nodes within a group. As discussed herein, groups including a source node may be referred to as source groups and groups including a destination group may be referred to as destination groups. It is noted that higher level groups including both source and destination nodes may be referred to as a source group in some cases and a destination group in other cases.

The next criteria class determines the next level of grouping of the first-level-groups. For example, the criteria may be an average latency bound of about 10 ms. In the example shown in FIG. 1, the second-level-groups include groups [$G_3^{[1]}$, $G_7^{[1]}$], and [$G_9^{[1]}$, $G_4^{[1]}$] marked in FIG. 1 as groups $G_1^{[2]}$ and $G_2^{[2]}$, respectively.

A next criteria class may determine a next level of grouping of the second-level-groups. In the example shown in FIG. 1, only a single third-level-group $G_5^{[3]}$ is shown. The third-level-group $G_5^{[3]}$ includes second-level-groups [$G_1^{[2]}$, $G_2^{[2]}$].

Based on this notation, in FIG. 1 the group that node A belongs to may be designated by a vector g including elements of the group hierarchy listed from left to right (representing lowest to highest level) using only the identifiers of the group at that level. The elements of a group vector g may also be referred to as a set of group identifiers. Therefore, as shown in FIG. 1, the group vector g of node A would be (3,1,5), and the group vector g of node N would be (4,2,5).

According to example embodiments, nodes are designated with the notation $v_j^{[g]}$ where g is the group vector and j is the node identifier (e.g., A, B, C, etc.). So, the designation for node A in FIG. 1 would be $v_A^{(3,1,5)}$.

As mentioned above, links interconnect the groups or nodes. Links are designated with the notation $e_{l,s}^{(g_l)(g_s)}$, where (l, s) is the link ID, ($g_l$) is the group vector for the node l and ($g_s$) is the group vector for node s.

Each node in the network has the same number of group vector elements, and the number of elements in each group vector also indicates the maximum hierarchical level of the topology.

As discussed herein, nodes may also be referred to by their respective node identifiers (e.g., A, B, C, etc.), rather than the notation shown in FIGS. 1 and 2.

Still referring to FIG. 1, each group $G_i^{[k]}$ has a designated group leader (DGL) indicated as $d_j^{(g)}$, where g is the group vector, and j is the node identifier of the designated group leader. The designated group leader may be any node in the group, and a top-level designated group leader at the network level overlooks the highest-level groups.

According to at least some example embodiments, multiple leader nodes may be selected and share leadership responsibility. The set of multiple designated group leaders may function according to any load sharing scheme. Regardless of the load sharing scheme, nodes may address designated group leaders of a given group by a single identifier.

A designated group leader's primary role is with the control plane procedures. However, as described in more detail below, designated group leaders may also assist nodes with cold start scenarios by packet forwarding as a user plane functionality.

Designated group leaders are the intelligence points that track how members of the group are interconnected. Designated group leaders solicit performance information from nodes in the group that terminate links that interconnect members of the group. Therefore, designated group leaders track the most up to date information about the status of the links that interconnect the groups, sub-groups or nodes in that network. Before providing route segment as query results, designated group leaders may apply various machine learning techniques to process and filter the available network status and performance data.

Each node is given or has a priori knowledge regarding how to obtain the necessary information needed to reach the designated group leaders of the groups of identified in the group vector for the node.

Formation of the groups, determination of the designated group leaders, and acquiring information about how to reach the designated group leaders may be done by manual configuration of each node by a network configurator (or network operator). The determination may also be performed by fully autonomous machine learning techniques with nodes collaborating between them without a network configurator. According to at least some example embodiments, methods including contributions from a network configurator and machine learning may also be used.

The network maintains a name server (not shown) to map any preferred identity (that may be used within a service level context) to the destination identity and the group vector instance of the nodes. Each node is given or has a priori knowledge of how to get the necessary information needed to reach the name server.

An example procedure that determines the configuration of the group and designated group leaders may be re-triggered any time for update purposes. After such configuration updates, designated group leaders inform nodes about configuration changes. These changes may also include route changes.

Node identities and routing information are not expected to be synchronized across the network. Rather, it is expected that network events may disrupt an assumed message route, but the vector-based routing information within each message allows transit nodes to take alternate actions in case of network events.

Routing operations according to one or more example embodiments are based on at least the principles that:
1. Each message contains information that reflects the orientational structure of the destination network;
2. Each message contains information on how to reach back to the source node (source group vector); and
3. Each network event is communicated back to the source node of a message whose transmission has been impacted.

According to one or more example embodiments, the maximum number of nodes in the network is assumed to be $2^{128}$, and each group is assumed to have at most $2^{16}$ or 65,536 members. Therefore, the largest network topology may have at most 8 hierarchical levels.

Assembling an end-to-end (E2E) route to a destination is the role of a source node. Therefore, according to at least some example embodiments, only the source node needs to maintain the associated state instances. However, the source node may assemble the route with the assistance of designated group leaders at different hierarchy levels. In at least one example embodiment, the significant information for route determination is the group vectors of the source and the destination nodes.

To determine the route to a destination node, the source node compares its own group vector (source group vector) with the group vector of the destination node (destination group vector). The source node examines the highest level at which the source group is different from the destination group (call it groups src and dst at level k), and sends a request to the designated group leader one level above the level at which the group differs (level k+1) requesting a route segment between the source group src and the destination group dst. The route request may include qualification criteria (such as Quality of Service (QoS) or the like).

Referring again to FIG. 1, for example, for a source group vector (p, q, r) for the source node and destination group vector (u, v, r) for the destination node, wherein the highest level at which the source group differs from the destination group is groups q and v at level k, the source node sends a message to the designated group leader of group $G_r^{[k+1]}$ requesting a route segment between groups $G_q^{[k]}$ and $G_v^{[k]}$. Based on the most recent (near real-time) link status and utilization information, the designated group leader of group $G_r^{[k+1]}$ sends the information about the route segment between groups $G_q^{[k]}$ and $G_v^{[k]}$ to the source node. The route segment information includes a set of alternate paths (links and nodes) that connect the two groups $G_q^{[k]}$ and $G_v^{[k]}$. The paths may be ranked according to some traffic engineering criteria—such as cost, latency and/or level of quality of service (QoS) support.

For each of the criterion, the designated group leader $G_r^{[k+1]}$ then sends a message to the designated group leaders of the two lower groups $G_q^{[k]}$ and $G_v^{[k]}$ asking the designated group leaders of the respective groups to send, to the source node, the route segments needed to connect the next lower level groups within the larger groups $G_q^{[k]}$ and $G_v^{[k]}$. This recursively and/or iteratively continues until the lowest layer is reached. After receiving responses to route segment requests, the source node assembles the E2E route from the set of received route segments from designated group leaders.

Figure 3:
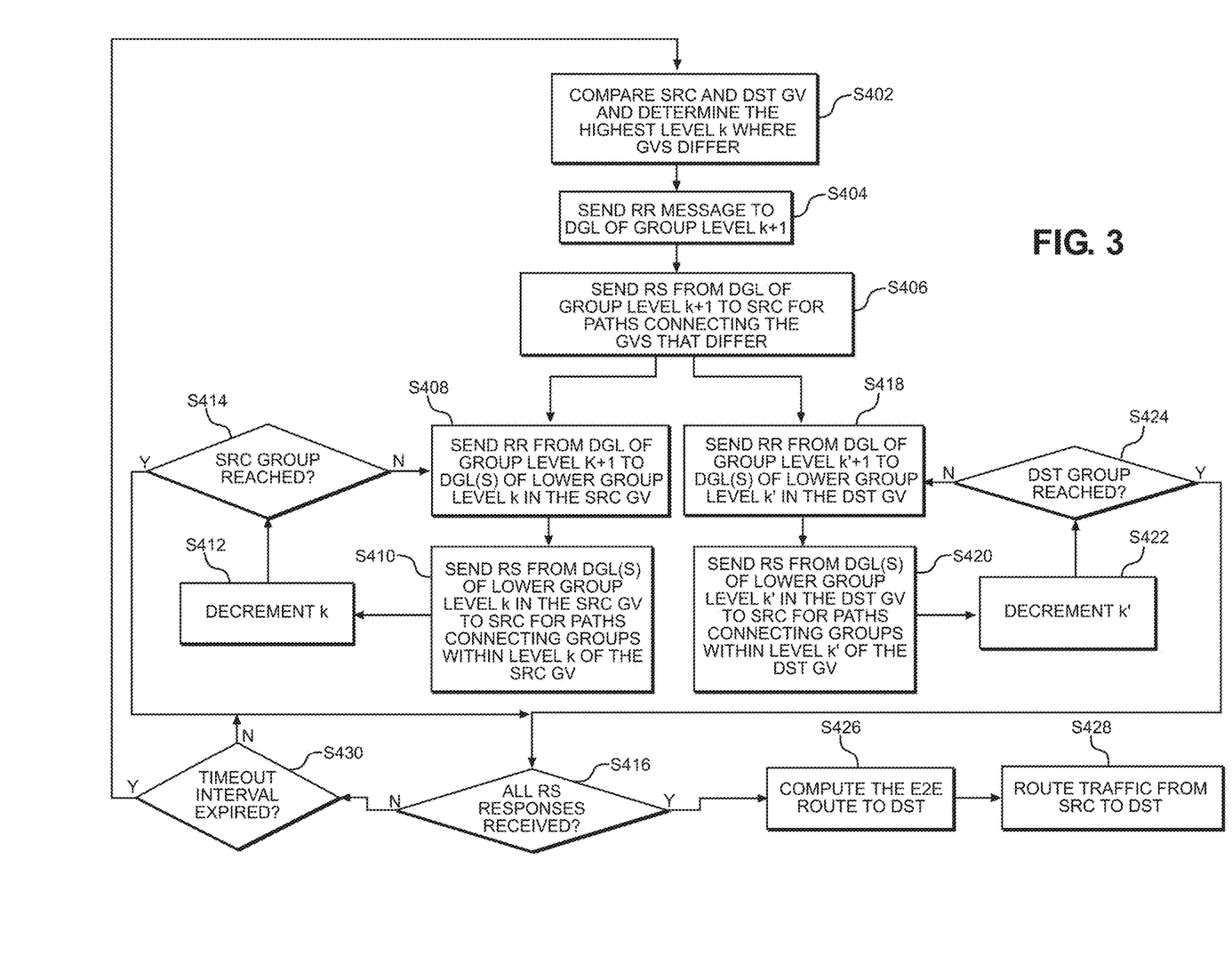
FIG. 3 is a flow chart illustrating a method according to example embodiments.

FIG. 3 is a flow chart illustrating a method for determining an E2E route from a source node to a destination node according to example embodiments. The method shown in FIG. 3 may be referred to as a Cluster Oriented Dynamic Routing (CODR) algorithm or method.

In FIG. 3, the following abbreviations are used for the sake of readability:
DGL: designated group leader;
DST: destination node;
GV: group vector;
RR: routing request;
RS: routing segment; and
SRC: source node.

For example purposes, the example embodiment shown in FIG. 3 will be discussed with regard to the three levels of groups shown in FIG. 1. It should be understood, however, that example embodiments are applicable to any number of levels of groups. Moreover, in this example, it is assumed that node A ($v_A^{(3,1,5)}$) is the source node, node N ($v_N^{(4,2,5)}$) is the destination node, node D ($d_D^{(7,1,5)}$) is the designated group leader of group $G_5^{[3]}$ at group level 3 (level k+1), node H ($d_H^{(9,2,5)}$) is the designated group leader of group $G_1^{[2]}$ at group level 2 (level k), and node H ($d_H^{(9,2,5)}$) is the designated group leader of group $G_2^{[2]}$ at group level 2 (level k).

Although some steps of the method shown in FIG. 3 are illustrated as being performed in parallel (e.g., concurrently or simultaneously), the values of a group level k in the destination group or grouping and the source group or grouping at a given time may be the same or different. Thus, in FIG. 3, k and k' are used to refer to values of the source group level and the destination group level, respectively.

Referring to FIG. 3, at step S402, source node A compares its source group vector (3,1,5) with the destination group vector (4,2,5) of the destination node N to determine the highest group level k that is different between the source group vector and the destination group vector. In this case, the highest group level that is different between the source group vector and the destination group vector is level k=2 (groups 1 and 2 at level k=2).

At step S404, source node A sends a request to the designated group leader of group $G_5^{[3]}$ (i.e., node D ($d_D^{(7,1,5)}$), which is one level above the group level k=2, requesting a route segment between groups $G_1^{[2]}$ and $G_2^{[2]}$ at level k=2. The route request may include qualification criteria (such as Quality of Service (QoS), or the like).

At step S406, based on the most recent (near real-time) link status and utilization information, node D (the designated group leader of group $G_5^{[3]}$) sends the information about the route segment between groups $G_1^{[2]}$ and $G_2^{[2]}$ at level k=2 to source node A. The route segment information includes a set of alternate paths (links and nodes, such as links $e_{E,H}^{(7,1,5)(9,2,5)}$ and $e_{F,K}^{(7,1,5)(9,2,5)}$) that connect groups $G_1^{[2]}$ and $G_2^{[2]}$. The paths may be ranked according to some traffic engineering criteria.

For each of the traffic engineering criteria, at step S418 the designated group leader of group $G_5^{[3]}$ (node D) sends a message to the designated group leader of the destination group $G_2^{[2]}$ node H ($d_H^{(9,2,5)}$)) at level k'=2 requesting that node H send route segments (e.g., links $e_{J,L}^{(9,2,5)(4,2,5)}$ and $e_{K,N}^{(9,2,5)(4,2,5)}$ needed to connect the groups $G_9^{[1]}$ and $G_4^{[1]}$ at the next lower level k'−1=1 to source node A.

At step S420, node H (the designated group leader of the destination group $G_2^{[2]}$) sends the route segment(s) to source node A.

At step S422, source node A decrements k' (k'=k'−1), and at step S424 source node A determines whether the destination group $G_4^{[1]}$ of the destination node N has been reached based on the destination group vector (e.g., the decremented value of k' equals the value of k' corresponding to the group in which the destination node N is located).

If source node A determines that the destination group has not been reached, then the process returns to step S418 and continues as discussed above.

Returning to step S424, if source node A determines that destination group $G_4^{[1]}$ has been reached, then the process continues to step S416. Steps S416, S426, S428 and S430 will be discussed later.

Turning now to step S408, node D (the designated group leader of group $G_5^{[3]}$) sends a message to node E (the designated group leader of group $G_1^{[2]}$) at the level k=2 in the source group requesting that node E (the designated group leader of group $G_1^{[2]}$) send route segments (e.g., links $e_{D,C}^{(7,1,5)(3,1,5)}$ and $e_{F,A}^{(7,1,5)(3,1,5)}$) needed to connect groups $G_7^{[1]}$ and $G_3^{[1]}$ at level k.

At step S410, node E (the designated group leader of group $G_1^{[2]}$) sends, to source node A, the route segment(s) for paths connecting groups $G_7^{[1]}$ and $G_3^{[1]}$ at level k of the source group.

At step S412, source node A decrements k (k=k−1), and at step S414 source node A determines whether its source group (e.g., source group $G_3^{[1]}$) has been reached (e.g., the decremented value of k equals the value of k at which source node A is located).

If source node A determines that its source group has not been reached, then the process returns to step S408 and continues as discussed above.

Returning to step S414, if source node A determines that its source group has been reached, then the process proceeds to step S416.

At step S416, source node A determines whether all route segment responses for the E2E route between source node A and destination node N have been received.

If all route segments for the route between source node A and destination node N have been received, then at step S426 source node A computes the E2E route from source node A to destination node N. Source node A may determine the best E2E route based on different criteria prescribed by policies. Node A relies on the source (itself) and the destination group vectors to generate the E2E route. Based on the group vectors, node A knows the minimum number of routes it has to have received to complete the path. It should be noted that the E2E route only has to include the links connecting the groups. Any missing connectivity within a group (an intra-group route) can be resolved by the routers of that group. For example, node A may receive routes from nodes C-D, F-K, and K-N. The missing intra-group connectivity between A-C and D-F may be resolved using existing, industry standard routing techniques.

At step S428, source node A then routes traffic from source node A to destination node N on the E2E route computed at step S426.

Returning to step S416, if all route segment responses for the E2E route between source node A and destination node N have not been received, then at step S430 source node A determines whether a timeout interval has expired. An example length of a timeout interval is about 15 seconds. However, example embodiments should not be limited to this example. The timeout interval may be initiated at the outset of the algorithm shown in FIG. 3, and may be set by a network operator based on empirical evidence or other criteria.

If source node A determines that the timeout interval has expired, then the process returns to step S402. To avoid an infinite loop, node A may implement one or more commonly used techniques to increase the timeout at each iteration and stopping at after a threshold number of iterations. For example, for the initial timeout interval t, node A may double the timeout value at each repeated iteration, and then stop after n iterations, such as for n equals 5. If stopped with unsuccessful result, node A returns a failure indication to the service that requested node A's service.

Returning to step S430, if source node A determines that the timeout interval has not yet expired, then the process returns to step S416 and continues as discussed herein. If all route segment responses are received before expiration of the timeout interval, then the process continues to step S426.

For the sake of clarity, example pseudo-code for implementing one or more example embodiments discussed above with regard to FIGS. 1-3 will now be discussed below. It should be understood, however, that example embodiments are not be limited to this pseudo-code. In the example pseudo-code, the following notation is used:

$v_s$, source node;
g, group vector;
$g_s$, source group vector;
$g_d$, destination group vector;
g([i]), i'th element of group vector;
$e^{g_i,g_j}(k)$, edge between group vectors i and j at level k;
$e^{g_i,g_j}(k)$, set of edges;
g(e[1]), group vector of the first endpoint of edge e;
g(e[2]), group vector of the second endpoint of edge e;
$d_g^{[k]}$, designated group leader of group vector at level k;
K, highest group level;
path={e}, vector of edges;
RouteRequst(g, g', k), recursive route request function, vector pointer starting at level k;
PickInterGroupEdges(d, g, g', k), DGL d to pick edges between given groups at level k, result ranked based on a criteria; and
PickEdgeForE2ERoute(e), chose one of the edges returned from DGL based on a criteria.

Given the notation above, the example pseudo-code for implementing at least one example embodiment of the CODR method shown in FIG. 3 is as follows:

```
start: RouteRequest( g_s,g_d,K)
function RouteRequest( g_1,g_2,k')
    for k = k'..1
        if g_1[k] ≠ g_2[k]
        {
            d = d_g1^[k+1], both g_1 and g_2 will have the same parent group
                e^g1,g2 = PickInterGroupEdges(d,g_1,g_2,k),
DGL picks best edges at group level
            e =
PickEdgeForE2ERoute(e^g1,g_2), v_s picks one of the edges for the E2E route
            path += e
            g_1 =
g(e[1]),   g_1 is now set to the group of the first vertex of the edge
            g_2 = g(e[2]),
                g_2 is now set to the group of the second vertex of the edge
            if | g_1 ∩ g_s |
                > | g_1
                ∩ g_d|, to pick the right brach as we traverse towards src and dst
                RouteRequest( g_s,g_1,k − 1)
                RouteRequest( g_2,g_d,k − 1)
            else
                RouteRequest( g_s, g_2,k − 1)
                RouteRequest( g_1, g_d,k − 1)
        return
}
```

According to one or more example embodiments, any state information regarding E2E route computation is kept (e.g., only) at the source node, and the computation for determining routes is done within the limited scope of the first route vector difference. Designated group leaders need not maintain a state or perform route calculation for assembling end-to-end routes.

Route segment queries to designated group leaders may return multiple options based on (e.g., given, defined, or alternatively, pre-determined criteria).

According to one or more example embodiments, nodes may cache the routes to destinations acquired based on a set of criteria (e.g., for a given amount of time). Designated group leaders may remember and/or store the nodes that requested routes based on the same or similar criteria. If a network state within the scope of a designated group leader changes in a way that may impact route calculation, then the designated group leader may notify the source node (or nodes) that requested route segments.

When the duration of packet flows extends beyond a certain time (or based on another criterion), source nodes may try different E2E route solutions (based on the received route segments) to explore possible, better routing options. Alternatively, source nodes may perform the CODR algorithm to explore possible, better options.

Source nodes may run prediction algorithms to identify the best time within packet flows to explore new E2E routes (e.g., not to cause packet reordering within the flow).

Maximum number of members in any group are bounded so that routing within a group may be handled by well-known methods. As discussed above, according to one or more example embodiments, the maximum number of members in a group is assumed to be $2^{16}$ or 65,536. In one example embodiment, when the network is configured, elements within groups may be fully connected as a mesh network via virtual links. In another example embodiment, routes may be populated (or, alternatively, pre-populated) between each group member. The designated group leader may take the role of maintaining and/or communicating the routing changes within the group.

Not to delay initial packet transmissions of a flow, if a node has never sent a packet to a given group vector (no record in the cache), then the designated group leader may temporarily assist forwarding the packets until a route is determined by the source node using, for example, the CODR algorithm according to example embodiments. In this case, the source node, while running the CODR algorithm, may also forward packets to the designated group leader of the first different group in the source group vector when compared to the destination group vector. In at least one other example embodiment, depending on the messaging Application Programming Interface (API), the source node may start sending the packets when the route is available. In yet another example embodiment, the source node may queue the packets until the route is available.

According to one or more example embodiments, all nodes participating in intra-group, inter-group, and E2E route calculation are expected to be equipped with network functions that may receive, interpret, and apply policies sent by a network controller (or other network apparatus or device) that may alter the existing functional logic that is in place.

Packets sent in the network that are subject to the routing procedures according to example embodiments may carry source and destination group vectors.

As network control becomes more autonomous and dynamic with new traffic engineering factors being introduced, the complexity of the routing problem may move beyond the capabilities of the existing protocols. A CODR algorithm, according to one or more example embodiments, may allow for use of the most up-to-date network status information with least amount of computing load on any one network node.

A CODR algorithm according to example embodiments may more optimally distribute decision points among many nodes and/or allow parallel execution on multiple nodes when assembling the E2E route.

A CODR algorithm, according to one or more example embodiments, may maximize the capacity (e.g., total capacity) of the network by distributing computational loads on to the demand-originating points.

Figure 4:
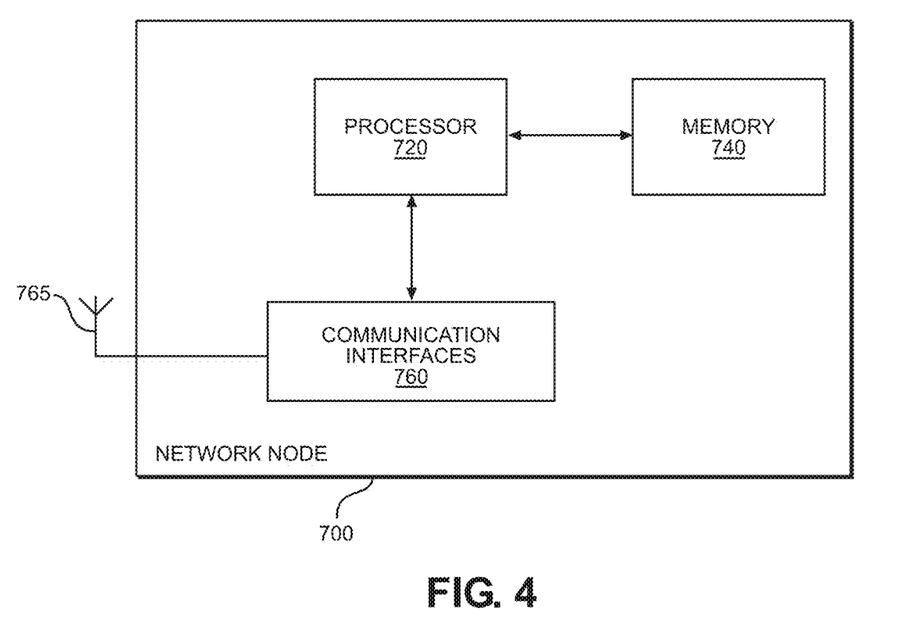
FIG. 4 illustrates an example embodiment of a network node.

FIG. 4 illustrates an example embodiment of a network node. The network node shown in FIG. 4 may serve as one or more of the network nodes shown in FIG. 1. The network node may also be referred to as a network apparatus or network device.

As shown, the network node 700 includes: a memory 740; a processor 720 connected to the memory 740; various interfaces 760 connected to the processor 720; and one or more antennas or antenna panels 765 connected to the various interfaces 760. The various interfaces 760 and/or the antenna 765 may constitute a transceiver for transmitting/receiving data from/to other network nodes and/or LANs via a wired or wireless links. As will be appreciated, depending on the implementation of the network node 700, the network node 700 may include many more components than those shown in FIG. 4. However, it is not necessary that all of these generally conventional components be shown in order to disclose the illustrative example embodiment.

The memory 740 may be a computer readable storage medium that generally includes a random access memory (RAM), read only memory (ROM), and/or a permanent mass storage device, such as a disk drive. The memory 740 also stores an operating system and any other routines/modules/applications for providing the functionalities of the network node 700 (e.g., functionalities of a network node, such as a router, a switch, etc., methods according to the example embodiments, etc.) to be executed by the processor 720. These software components may also be loaded from a separate computer readable storage medium into the memory 740 using a drive mechanism (not shown). Such separate computer readable storage medium may include a disc, tape, DVD/CD-ROM drive, memory card, or other like computer readable storage medium (not shown). In some example embodiments, software components may be loaded into the memory 740 via one of the various interfaces 760, rather than via a computer readable storage medium.

The processor 720 may be configured to carry out instructions of a computer program by performing the arithmetical, logical, and input/output operations of the system. Instructions may be provided to the processor 720 by the memory 740.

The various interfaces 760 may include components that interface the processor 720 with the antenna 765, or other input/output components. As will be understood, the various interfaces 760 and programs stored in the memory 740 to set forth the special purpose functionalities of the network node 700 will vary depending on the implementation of the network node 700.

The interfaces 760 may also include one or more user input devices (e.g., a keyboard, a keypad, a mouse, or the like) and user output devices (e.g., a display, a speaker, or the like).

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing network elements, data servers, network resource controllers, network apparatuses, clients, routers, gateways, network nodes, computers, cloud-based servers, web servers, application servers, proxies or proxy servers, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

Although example embodiments are discussed herein with regard to data servers, network devices may also include be network elements such as network resource controllers, network apparatuses, clients, routers, gateways, network nodes, computers, cloud-based servers, web servers, application servers, proxies or proxy servers, or the like.

According to example embodiments, network elements, network devices, data servers, network resource controllers, network apparatuses, clients, routers, gateways, network nodes, computers, cloud-based servers, web servers, application servers, proxies or proxy servers, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A method for routing traffic between a source node and a destination node in a network, the method comprising:
    comparing elements of a source group vector with elements of a destination group vector to identify a first group level at which the source group vector and the destination group vector differ, wherein
        the source group vector includes a set of source group identifiers for the source node, each source group identifier in the set of source group identifiers identifying a source group at a group level in a hierarchy of source groups including the source node, and
        the destination group vector includes a set of destination group identifiers for the destination node, each destination group identifier in the set of destination group identifiers identifying a destination group at a group level in a hierarchy of destination groups including the destination node;
    obtaining one or more first route segments between a first source group and a first destination group at the first group level;
    computing an end-to-end route between the source node and the destination node based on at least the one or more first route segments; and
    routing traffic between the source node and the destination node on the end-to-end route.

2. The method of claim 1, further comprising:
    obtaining one or more second route segments between at least two second source groups at a second group level in the hierarchy of source groups;
    obtaining one or more third route segments between at least two second destination groups at the second group level in the hierarchy of destination groups; wherein
        the computing computes the end-to-end route based on the one or more first route segments, the one or more second route segments and the one or more third route segments, and
        the second group level is lower than the first group level.

3. The method of claim 1, wherein
    the hierarchy of source groups includes a plurality of group levels arranged based on a first performance metric, or
    the hierarchy of destination groups includes a plurality of group levels arranged based on a second performance metric.

4. The method of claim 3, wherein
    the first performance metric includes at least one of latency, geo-location, or an administrative attribute associated with nodes in each source group; or
    the second performance metric includes at least one of latency, geo-location or an administrative attribute associated with nodes in each destination group.

5. The method of claim 1, further comprising:
    determining that all route segments connecting the source node and the destination node have been collected; and wherein
    the computing computes the end-to-end route in response to determining that all route segments connecting the source node and the destination node have been collected.

6. The method of claim 1, wherein
    the first group level is a $k^{th}$ group level; and
    the obtaining includes
        sending a first route request to a designated group leader of a source group at a $(k+1)^{th}$ group level, the first route request requesting the one or more first route segments, and
        receiving the one or more first route segments from the designated group leader of a source group at a $(k+1)^{th}$ group level in response to the first route request.

7. The method of claim 6, further comprising:
    sending a second route request to a designated group leader of the source group at the $k^{th}$ group level, the second route request requesting one or more second route segments between source groups at a $(k-1)^{th}$ group level;
    receiving the one or more second route segments from the designated group leader of the source group at the $k^{th}$ group level in response to the second route request;
    sending a third route request to a designated group leader of a destination group at the $k^{th}$ group level, the third route request requesting one or more third route segments between destination groups at the $(k-1)^{th}$ group level;
    receiving the one or more third route segments from the designated group leader of the destination group at the $k^{th}$ group level in response to the third route request; and wherein the computing computes the end-to-end route based on the one or more first route segments, the one or more second route segments and the one or more third route segments.

8. A network apparatus comprising:
at least one processor; and
at least one memory including computer program code, the at least one memory and the computer program code configured to, with the at least one processor, cause the network apparatus to
compare elements of a source group vector with elements of a destination group vector to identify a first group level at which the source group vector and the destination group vector differ, wherein
the source group vector includes a set of source group identifiers for the network apparatus, each source group identifier in the set of source group identifiers identifying a source group at a group level in a hierarchy of source groups including the network apparatus, and
the destination group vector includes a set of destination group identifiers for a destination node, each destination group identifier in the set of destination group identifiers identifying a destination group at a group level in a hierarchy of destination groups including the destination node,
obtain one or more first route segments between a first source group and a first destination group at the first group level,
compute an end-to-end route between the network apparatus and the destination node based on at least the one or more first route segments, and
route traffic between the network apparatus and the destination node on the end-to-end route.

9. The network apparatus of claim 8, wherein the at least one memory and the computer program code are configured to, with the at least one processor, cause the network apparatus to
obtain one or more second route segments between at least two second source groups at a second group level in the hierarchy of source groups; and
obtain one or more third route segments between at least two second destination groups at the second group level in the hierarchy of destination groups; wherein
the end-to-end route is computed based on the one or more first route segments, the one or more second route segments and the one or more third route segments, and
the second group level is lower than the first group level.

10. The network apparatus of claim 8, wherein
the hierarchy of source groups includes a plurality of group levels arranged based on a first performance metric, or
the hierarchy of destination groups includes a plurality of group levels arranged based on a second performance metric.

11. The network apparatus of claim 10, wherein
the first performance metric includes at least one of latency, geo-location, or an administrative attribute associated with nodes in each source group; or
the second performance metric includes at least one of latency, geo-location or an administrative attribute associated with nodes in each destination group.

12. The network apparatus of claim 8, wherein
the at least one memory and the computer program code are configured to, with the at least one processor, cause the network apparatus to determine that all route segments connecting the network apparatus and the destination node have been collected, and
the end-to-end route is computed in response to determining that all route segments connecting the network apparatus and the destination node have been collected.

13. The network apparatus of claim 8, wherein
the first group level is a $k^{th}$ group level; and
the at least one memory and the computer program code are configured to, with the at least one processor, cause the network apparatus to obtain the one or more first route segments by
sending a first route request to a designated group leader of a source group at a $(k+1)^{th}$ group level, the first route request requesting the one or more first route segments, and
receiving the one or more first route segments from the designated group leader of a source group at a $(k+1)^{th}$ group level in response to the first route request.

14. The network apparatus of claim 13, wherein the at least one memory and the computer program code are further configured to, with the at least one processor, cause the network apparatus to obtain the one or more first route segments by
sending a second route request to a designated group leader of the source group at the $k^{th}$ group level, the second route request requesting one or more second route segments between source groups at a $(k-1)^{th}$ group level;
receiving the one or more second route segments from the designated group leader of the source group at the $k^{th}$ group level in response to the second route request;
sending a third route request to a designated group leader of a destination group at the $k^{th}$ group level, the third route request requesting one or more third route segments between destination groups at the $(k-1)^{th}$ group level;
receiving the one or more third route segments from the designated group leader of the destination group at the $k^{th}$ group level in response to the third route request; and wherein
the end-to-end route is computed based on the one or more first route segments, the one or more second route segments and the one or more third route segments.

15. A non-transitory computer-readable medium storing computer-executable instructions that, when executed by at least one processor at a source node, cause the source node to perform a method for routing traffic between the source node and a destination node in a network, the method comprising:
comparing elements of a source group vector with elements of a destination group vector to identify a first group level at which the source group vector and the destination group vector differ, wherein
the source group vector includes a set of source group identifiers for the source node, each source group identifier in the set of source group identifiers identifying a source group at a group level in a hierarchy of source groups including the source node, and
the destination group vector includes a set of destination group identifiers for the destination node, each destination group identifier in the set of destination group identifiers identifying a destination group at a group level in a hierarchy of destination groups including the destination node;

obtaining one or more first route segments between a first source group and a first destination group at the first group level;

computing an end-to-end route between the source node and the destination node based on at least the one or more first route segments; and routing traffic between the source node and the destination node on the end-to-end route.

16. The non-transitory computer-readable medium of claim 15, wherein the method further comprises:

obtaining one or more second route segments between at least two second source groups at a second group level in the hierarchy of source groups;

obtaining one or more third route segments between at least two second destination groups at the second group level in the hierarchy of destination groups; wherein the computing computes the end-to-end route based on the one or more first route segments, the one or more second route segments and the one or more third route segments, and the second group level is lower than the first group level.

17. The non-transitory computer-readable medium of claim 15, wherein the first group level is a $k^{th}$ group level; and the obtaining includes sending a first route request to a designated group leader of a source group at a $(k+1)^{th}$ group level, the first route request requesting the one or more first route segments, and receiving the one or more first route segments from the designated group leader of a source group at a $(k+1)^{th}$ group level in response to the first route request.

18. The non-transitory computer-readable medium of claim 17, wherein the method further comprises:

sending a second route request to a designated group leader of the source group at the $k^{th}$ group level, the second route request requesting one or more second route segments between source groups at a $(k-1)^{th}$ group level;

receiving the one or more second route segments from the designated group leader of the source group at the $k^{th}$ group level in response to the second route request;

sending a third route request to a designated group leader of a destination group at the $k^{th}$ group level, the third route request requesting one or more third route segments between destination groups at the $(k-1)^{th}$ group level;

receiving the one or more third route segments from the designated group leader of the destination group at the $k^{th}$ group level in response to the third route request; and wherein the computing computes the end-to-end route based on the one or more first route segments, the one or more second route segments and the one or more third route segments.

\* \* \* \* \*